United States Patent

[11] 3,587,713

[72] Inventor Gordon Halsey
Oswestry, England
[21] Appl. No. 735,959
[22] Filed June 11, 1968
[45] Patented June 28, 1971
[73] Assignee Monsanto Chemicals Limited
Monsanto House, London, England
[32] Priority June 28, 1967
[33] Great Britain
[31] 29784/67

[54] PRODUCTION OF MOULDS AND CASTINGS
11 Claims, No Drawings
[52] U.S. Cl...................................................... 164/131,
164/26, 164/35, 164/138
[51] Int. Cl....................................................B22d 29/00,
B22c 9/04
[50] Field of Search........................................... 164/25, 26, 34, 35, 36, 131, 132, 138; 249/61

[56] References Cited
UNITED STATES PATENTS

| | | | |
|---|---|---|---|
| 3,311,956 | 4/1967 | Townsend et al............. | 249/61X |
| 3,459,253 | 8/1969 | Woolcott...................... | 164/36 |

FOREIGN PATENTS

| | | | |
|---|---|---|---|
| 600,093 | 3/1948 | Great Britain................ | 164/26 |
| 1,023,829 | 3/1966 | Great Britain................ | 164/26 |

*Primary Examiner*—J. Spencer Overholser
*Assistant Examiner*—John E. Roethel
*Attorneys*—Richard W. Sternberg, Roger R. Jones and James J. Mullen

ABSTRACT: Production of a ceramic shell mould for use in metal casting which comprises forming on a disposable pattern a shell mould, removing the pattern, firing the mould, casting metal into said mould, solidifying said metal and removing said mould from said solidified metal. The shell mould is characterized by containing a particulate ceramic refractory material, a binding agent and an inorganic material which loses carbon dioxide upon firing to form an oxide.

PRODUCTION OF MOULDS AND CASTINGS

This invention relates to the production of moulds, in particular to a process for the production of ceramic moulds for use in metal casting, and to a process of metal casting employing ceramic moulds.

A problem that has in certain instances hindered the utilization of ceramic shell moulds for the manufacture of metal castings stems from the fact that the material of the mould can adhere tightly to the surface of the casting. The problem is particularly acute where a casting is of such a shape as to give rise to trapped pockets of ceramic firmly held by contraction of the metal on cooling, or where the metal (such as aluminum) is comparatively soft so that efforts to remove the ceramic by hammering or shot-blasting can damage its surface. The present invention is directed to a solution of the problem by providing means whereby the shell is rendered more susceptible to attack by water or by aqueous acid or alkali so as to facilitate its removal from the casting.

The invention comprises a process for the production of a ceramic shell mould for use in metal casting by forming on a disposable pattern a shell mould comprising a particulate ceramic refractory material and a binding agent, removing the pattern and firing the mould, in which there is included in the fabric of the unfired mould a particulate solid substance that is substantially unattacked by the binding agent during formation of the mould but is converted on firing to a material that renders the finished mould more susceptible to attack by water or by aqueous acid or alkali.

The invention also comprises a fired ceramic shell mould comprising a binding agent, a particulate ceramic refractory material and a material that renders the mould more susceptible to attack by water or by aqueous acid or alkali.

Also part of the invention is a process of casting a metal into a ceramic shell mould according to the invention, removal of ceramic from the casting being assisted by subjecting it to the action of water or a dilute acid or alkali.

The substance convertible on firing to a susceptible material is substantially unattacked by the other slurry components, particularly the binding agent. Normally it is substantially insoluble in water, firstly because a water-soluble substance would be prematurely attacked, and secondly because its dissolution in the binding agent could cause the latter to be unstable. Preferably it is crystalline or microcrystalline rather than amorphous.

A preferred class of inorganic materials or substances convertible on firing to a susceptible material comprises metal carbonates that are substantially water-insoluble and which at the firing temperature lose carbon dioxide to form an oxide. The carbonates of calcium and magnesium are preferred; strontium carbonate, for example strontianite, can also be used if desired although it would normally be excluded on account of its relatively high cost. Dolomite, magnesite marble and calcite are often convenient substances to use.

The susceptible material formed on firing need not be itself soluble in water or in aqueous acid or alkali. For example, calcium oxide formed from calcium carbonate reacts with water to form slaked lime, the reaction being accompanied by disruption of the bond between the binding agent and the oxide and by partial dissolution of the slaked lime produced. This disruption effect can be used for example to increase the efficiency with which an alkaline solution can be used to attack a silica binding agent, or a dilute acid can be used to hasten attack on the slaked lime.

The practice in the production of conventional ceramic shell moulds is to build up a shell of sufficient thickness by applying to the pattern a succession of coats of particulate refractory material. The first coat is applied as a slurry to the refractory material in a liquid binding agent, usually a silica sol or a hydrolyzed silicate ester solution, which is then gelled or set. This is followed by a coating of particles of a refractory material applied as a stucco to the gelled first coat while the latter is still damp. Slurry coatings and stucco are then applied alternately until a shell of the required thickness has been built up. The thickness of each slurry coating is determined largely by the viscosity of the slurry, thickness of from 0.2 mm. to 1 mm. being usual. The assembly is then dried, the pattern is removed, for example by melting or dissolving out, and the resulting shell is fired, usually at a temperature in the range of 950° C. to 1100° C., although a wider range, for example from 800° C. to 1300° C. can be employed. Firing times normally vary from about 15—20 minutes to about 2 hours, depending on the size and thickness of the mould. A period of about 1 hour is typical.

Each slurry coating and its associated stucco is commonly referred to as an investment layer, the first such layer being termed the primary-investment layer, and the second and subsequent layers, secondary-investment layers.

In the usual manner of operating the process of the present invention, the particulate solid convertible substance is admixed with or replaces the refractory material in one or more of the coatings applied to the pattern in building up the shell. Most conveniently, the convertible substance is used as or is included in a stucco coating, which procedure has the advantage of reducing the probability of for instance a carbonate affecting the stability of an acidic binding agent. A preferred feature is that the convertible substance be present as the stucco in the secondary-investment layers but not in the primary-investment layer. The convertible substance is preferably distributed substantially uniformly throughout, or forms, the stucco or slurry coating in one or more such layers.

The refractory materials generally available may be used, for example, Molochite, silica, zircon and alumina. For use in a slurry coating, it is usual for the refractory to be in a state of subdivision such that none is retained on a 200 British Standard Sieve (B.S.S.) mesh and preferable that it should contain a substantial proportion of particles that are fine enough to pass through a 300 mesh British Standard Sieve (B.S.S.).

For use as a stucco coating, a somewhat coarser refractory material is preferable; this, for example, can usefully contain more than 50 percent of particles having sizes in the range 40 to 100 B.S.S. mesh, although finer material may also be present. The convertible substance used in the process of the present invention should preferably have a particle size range comparable with that of the refractory with which it is mixed or which it replaces.

The convertible substance can entirely replace the refractory material in either the slurry or the stucco used in forming one or more investment layers; preferably however it is mixed with refractory. Where the convertible substance is used in admixture with a refractory material whether in the form of a slurry or a stucco, its proportion should preferably exceed 10 percent by weight of the mixture, and more preferably forms at least 25 percent, for example about 50 percent, by weight of the mixture.

The binding agent used in the production of a shell mould in the process of the invention can conveniently be a silicate ester such as for instance ethyl silicate, for example the condensed ethyl silicate sold as "Silester OS," or a silica sol having a concentration of between 20 and 40 percent by weight of silica, such as for example those sold as "Syton 2X" and "Syton P" ("Silester" and "Syton" are Registered Trademarks).

While the process herein described can be used for the production of castings of steels and other hard metals, its particular advantage lies in the fact that it permits satisfactory casting of comparatively soft metals, for instance on aluminum or magnesium alloy, from which the removal of ceramic shell moulds has hitherto been difficult. Backing with plaster or a granular refractory may be desirable where steel is cast.

The invention is illustrated by the following Example.

EXAMPLE

Four wax assemblies were prepared in the form of 1-inch square sprues 10 inches long and with miscellaneous wax patterns attached.

One wax assembly was used to build up a ceramic shell mould in the conventional way using a primary coating of zircon flour bonded with colloidal silica sol and five secondary coatings of Molochite No. 6 bonded with hydrolyzed ethyl silicate. Molochite No. 10 material was used as a stucco on all slurry coatings.

The other three wax assemblies were used to make ceramic shell moulds the only difference in technique being that crushed marble, the particles of which varied in size from 10 to 30 mesh was mixed with the Molochite stucco in the secondary-investment layers. The stucco used in forming the secondary layers of the second mould contained 10 percent by weight of marble while for the third and fourth moulds this proportion was 50 percent by weight.

After four layers had been applied to the assemblies, the latter were joined together in pairs by wax patterns of a pouring cup, and two further coatings of slurry and stucco were applied. The assemblies were dried, subjected to a temperature of 150° C. to melt out the wax, and then fired at a temperature of 1000° C. for 1 hour.

Using the first two moulds thus produced, castings were made from a 0.4 percent carbon steel, and the cold moulds were immersed in water for 5 minutes. It was found that the first mould was unaffected by the water treatment whereas the second mould was considerably softened and could more easily be removed by shot-blasting.

The third mould was backed with a granular refractory and used to produce a 0.4 percent carbon steel casting. The mould disintegrated almost completely on immersion in water for 5 minutes and could be washed off the casting by a jet of water.

The fourth mould was used to make a casting in an 11 percent silicon-aluminum alloy, the backing with granular refractory being found unnecessary for casting this metal. Again it was found that 5 minutes immersion in water caused almost complete disintegration of the mould, permitting removal without damaging the surface of the casting in any way.

These results demonstrate the improvements obtained by incorporating marble in a shell mould in accordance with the invention.

It is to be understood that it is also within one scope of the present invention that the processes described herein in casting various metals including casting metals such as high-chromium steels, plain low-carbon steels, for example, BS 1617A and CLA 9, low-alloy steels, for example, those of the Fortiweld variety and type EN 36C, high-carbon high-alloy tool steels generally containing around 12 percent chromium and other alloys which are commonly utilized in the art of casting.

It is also to be understood that it is within the scope of the present invention that the particular inorganic material such as calcium carbonate is admixed with or replaces the refractory material in one or more of the coatings applied to the pattern in building up the shell. Most conveniently, the inorganic material is used as or is included in a stucco coating. A preferred feature is that the inorganic material be present as the stucco in the second of the secondary investment layers or in one or more subsequent layers but not in the primary investment or the first of the secondary-investment layers.

I claim:

1. A process for the production of a ceramic shell mould for use in metal casting which comprises the steps of (1) forming on a disposable pattern a shell mould comprising a particulate ceramic refractory material, a binding agent selected from the group consisting of colloidal silica sols and alkyl silicates, and a particulate solid substance that is substantially water insoluble and substantially unattacked by the binding agent during formation of the mould, and loses carbon dioxide during the firing step to form an oxide, (2) removing the pattern and (3) firing the mould whereby a mould is obtained which, when subjected to a treatment by an aqueous medium, may readily be removed from the metal casting.

2. A process according to claim 1, in which the particulate solid convertible substance is a metal carbonate that is substantially water-insoluble and which at the firing temperature loses carbon dioxide to form an oxide.

3. A process according to claim 2, in which the particulate solid convertible substance is selected from the group consisting of calcium carbonate and magnesium carbonate.

4. A process according to claim 3, in which the particulate solid convertible substance is used as or is included in one or more stucco coatings applied to the pattern in building up the shell.

5. A process according to claim 4, in which the particulate solid convertible substance is included in one or more of the secondary investment layers but not in the primary-investment layer of the ceramic shell mould.

6. A process according to claim 5, in which the particulate solid convertible substance is used as an admixture with the particulate refractory material, said admixture containing at least 25 percent by weight of the particulate solid convertible substance.

7. A process for the production of a metal casting which comprises the steps of (1) forming a shell mould on a disposable pattern by applying alternative coatings of (a) a slurry of a particulate ceramic refractory material and a binding agent selected from the group consisting of colloidal silica sols and alkyl silicates, and (b) a stucco of a particulate ceramic refractory material per se thereto, said shell mould containing, in addition to items (a) and (b), a particulate solid substance that is substantially water insoluble and substantially unattached by the binding agent which losses carbon dioxide upon firing and forms an oxide and which is admixed with or replaces such refractory material in one or more of said coatings applied to said pattern in building up said shell to a desired thickness; (2) separating said disposable pattern from said shell mould; (3) heating said shell mould for a sufficient period of time and at a temperature in order to substantially harden said shell mould; (4) casting metal into the hardened shell mould; (5) solidifying said metal; and (6) removing said mould from said solidified metal, said removal being effected at least in part by subjecting said metal-containing mould to the action of an aqueous media.

8. The process as set forth in claim 7, wherein one coating of item (a) plus one coating of item (b) constitutes a layer, and the particulate fusible material constitutes or is part of the stucco coating of one or more of the layers applied to said disposable pattern starting with the third layer.

9. The process as set forth in claim 8, wherein the stucco coating of one or more of such layers is a mixture of said solid substance and said refractory material, said solid substance being greater than 10 percent by weight of the total weight of said mixture.

10. The process as set forth in claim 9, wherein the solid substance is a metal carbonate which constitutes from about 25 percent to about 50 percent by weight of said mixture 11. A process as set forth in claim 10, wherein the metal that is cast is selected from the group consisting of a plain low-carbon steel, a low-alloy steel, a high-carbon high-alloy tool steel, a ferritic stainless steel and a martensitic stainless steel.

PO-1050
(5/69)

UNITED STATES PATENT OFFICE
CERTIFICATE OF CORRECTION

Patent No. 3,587,713            Dated June 28, 1971

Inventor(s) Gordon Halsey

It is certified that error appears in the above-identified patent and that said Letters Patent are hereby corrected as shown below:

In column 4, claim 7, line 35, the word "unattached" should read---unattacked---.

Signed and sealed this 12th day of September 1972.

(SEAL)
Attest:

EDWARD M. FLETCHER, JR.          ROBERT GOTTSCHALK
Attesting Officer                 Commissioner of Patents